United States Patent [19]

Bethe et al.

[11] 4,336,230

[45] Jun. 22, 1982

[54] FREQUENCY CHIRP IN ISOTOPICALLY SELECTIVE PHOTOEXCITATION

[75] Inventors: Hans A. Bethe, Ithica, N.Y.; Ching S. Chang, Malden, Mass.

[73] Assignee: Jersey Nuclear-Avco Isotopes, Inc., Bellevue, Wash.

[21] Appl. No.: 862,409

[22] Filed: Dec. 20, 1977

[51] Int. Cl.$^3$ ............................................. B01D 59/00
[52] U.S. Cl. .............................. 423/3; 204/157.1 R; 250/423 P; 422/159; 422/186
[58] Field of Search ............ 204/157.1 R; 250/423 P, 250/527; 422/159, 186

[56] References Cited

U.S. PATENT DOCUMENTS

| | | | |
|---|---|---|---|
| 4,023,038 | 5/1977 | Janes et al. | 250/423 P |
| 4,035,638 | 7/1977 | Szoke et al. | 250/423 P |
| 4,038,549 | 7/1977 | Janes et al. | 250/423 P |
| 4,047,026 | 9/1977 | Bjorkholm et al. | 250/251 |
| 4,049,515 | 9/1977 | Robinson et al. | 204/157.1 R |
| 4,073,572 | 2/1978 | Avicola | 250/284 X |
| 4,088,898 | 5/1978 | Stitch | 331/94.5 M |
| 4,107,536 | 8/1978 | St. Peters | 250/423 P |
| 4,107,537 | 8/1978 | Forsen et al. | 250/423 P |
| 4,144,453 | 3/1979 | Rigny | 250/432 P |

FOREIGN PATENT DOCUMENTS 828557 5/1975 Belgium .
1510862 5/1978 United Kingdom .

OTHER PUBLICATIONS

Robinson, C. P., "Laser Isotope Separation," Paper Presented at 2nd Laser Spec. Conf., Megeve, France, Jun. 23-28, 1975, Report #LA-VR-75-1090.
Gerstenkorn, S., "Structure Hyperfine Du Niveau Fondamental . . . De L'isotope 235 De L'Uranium," *J. De Phys.*, 34: 805-812, 1973.

*Primary Examiner*—Deborah L. Kyle
*Attorney, Agent, or Firm*—Weingarten, Schurgin & Gagnebin

[57] ABSTRACT

Method and apparatus for inducing isotopically selective photoexcitation of atoms in at least first and second energy steps. The total energy change accomplished by the two energy steps is provided with isotopic selectivity at precise resonance for the two steps. In an isotope separation system in which an environment of particles of plural isotope types is created, isotopically selective photoexcitation from laser radiation is shown to produce a great improvement in excitation efficiency where the radiation is controlled in the aggregate of plural photons to achieve precise resonance over the plurality of the degenerate energy steps. Even with multimode excitation, precise resonance is only achieved for isolated atoms, and a chirp or frequency sweep is applied to one of several excitation frequencies to insure precise resonance at least once for each atom. In the case of excitation in plural transitions from plural low-lying energy through a generally common upper transition, the chirp may be applied to the radiation producing the common upper level transition alone.

33 Claims, 5 Drawing Figures

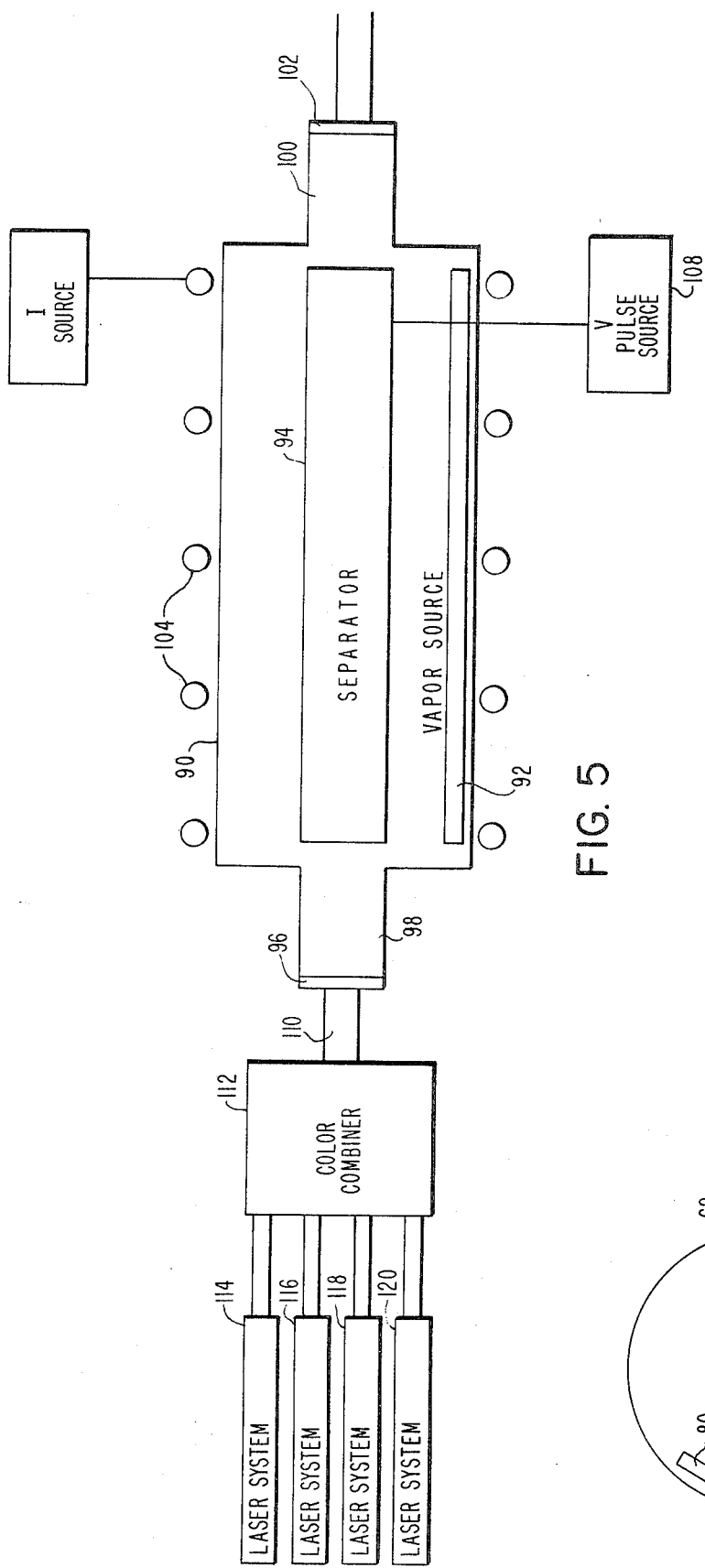

FREQUENCY CHIRP IN ISOTOPICALLY SELECTIVE PHOTOEXCITATION

FIELD OF THE INVENTION

The present invention relates to isotopically selective photoexcitation and in particular to such excitation in a system for isotope separation.

BACKGROUND OF THE INVENTION

A number of complementing schemes for producing isotopically selective photoexcitation in a process for isotope separation such as uranium enrichment are known in the art including the early teaching of the technique in U.S. Pat. No. 3,772,519 in which it is appreciated that selective excitation may be achieved by a finely tuned beam of laser radiation applied to an environment of vapor particles. It has been additionally suggested that the excitation radiation may be chirped or frequency swept over the bandwidth of isotopically selective absorption for the photoexcitation transition as illustrated in Belgian Pat. No. 828,557, and U.S. patent application Ser. No. 729,893, filed Oct. 6, 1976, now U.S. Pat No. 4,088,898 all commonly assigned with the present application.

Recent investigations of the processes of excitation, particularly in the uranium atom and of the desired isotope type, U-235, has led to the development of some specific parameters for the excitation, and for frequency sweeping which permits more effective and economical isotope separation techniques. These are particularly applied in the case where more than a single step of photoexcitation is employed and where excitation from plural low-lying initial energy states in desired as, for example, discussed in commonly assigned Belgian Pat. Nos. 807,118 and 816,057.

In particular, it is known that laser radiation produced by a tuned cavity consists of a number of mode lines or distinct frequencies separated by up to 100 MHz or more within the laser bandwidth. Within the space between modes substantially no useful radiation occurs. At the same time, the absorption frequency for a selected isotope in a mixture of many particles of that and other isotope types includes a bandwith which, while distinct from the absorption frequencies for other isotopes is nevertheless spread over a range of frequencies. This is due to various broadening or degeneracy characteristics of the many individual particles of that one isotope type. Thus a perfect match is impossible between the discrete frequencies of the individual modes of excitation radiation and all the particles of the selected isotope type. A near miss of this sort does not prevent excitation of the particles however. A closeness of this sort is sufficient to permit excitation probabilities effective for isotope separation as specified in the above-identified patents. Closeness is assured by the presence of a number of mode lines distributed over the absorption frequency range for the many particles.

BRIEF SUMMARY OF THE INVENTION

The present invention is based on a rigorous investigation of the interaction processes between an atom and a radiation pulse. When radiation frequencies are very near atomic transition frequencies, the numbers of atomic transitions or excitations through absorptions of radiation quanta will vary as a function of the distance the radiation is off from precise resonance. That is, "precise" resonance between radiation and a specific particle produces a great increase in the probability that that particle will be excited. This effect is masked in the real world because the precise absorption frequencies for many particles are spread over a spectrum. No matter where one or more mode lines are then placed, there are approximately the same number of close matches and precise frequency matches. Different placement of the modes throughout the isotope range of hyperfine structure will not reveal the existence of the great improvement in excitation probability for the case of a precise match.

This blurring of absorption phenomena is increased where plural steps of excitation are required. This is typically the situation in laser induced isotope separation.

Theoretical studies of the atomic-radiation interaction reveal this substantial increase in precise resonance absorption probability. Applied to isotopically selective photo-excitation of many particles in the real world, this theory points to the desirability of having precise resonance with each of the many particles of the selected isotope type throughout the entire line structure frequency range.

It is found that to achieve high excitation and ionization with complete line coverage that insures precise resonance, far less laser intensity is required than that with the previously used set of discrete fixed modes. Minimum intensity is not only desirable for the process to be efficient, but also important for the reliability of plant performance. An intense radiation pulse is difficult to propagate through economically reasonably distances. Laser beam degradation results from well known nonlinear optics effects, and from nearly linear effects such as heating and distortion of optical elements.

In the practical world, however, mode spacings preclude the existence of complete line coverage except with very closely spaced modes that require impractical cavity configurations. A solution lies in the system of the present invention which is to provide full line coverage by varying the mode positions continuously over the duration of the radiation. The radiation is typically applied in pulses of about 1 to 2 microsecond durations and in this interval the plurality of modes are swept at least one line width so that precise resonance is achieved at least once for each atom of the desired isotope type.

In the case where plural excitation steps are provided as with isotope separation, obtaining precise resonance for a particular atom at more than one transition is vastly more difficult. As a further aspect of the invention, it has been determined that in a plural energy step process using plural radiations, it is sufficient that precise resonance be achieved for the aggregate energy change. If the radiation is close to resonant for intermediate steps, the effect of increased excitation probability for precise resonance can be realized if precise resonance is achieved for the total energy change during the transition. This leads to simplification of the frequency sweeping apparatus for plural step isotope separation, by permitting the improvement in efficiency when only a single one of the plural frequencies is swept or chirped.

In other cases, the generation of a modeless laser pulse, where a cavity is not present, will automatically satisfy the two photon resonance requirements. The modeless laser has a continuous frequency distribution, equivalent to a chirped, plural mode, pulse.

BRIEF DESCRIPTION OF THE DRAWING

These and other features of the present invention are more fully set forth below in the accompanying detailed description, presented solely for purposes of exemplification and not by way of limitation, and in the accompanying drawing, of which:

FIG. 4 is a view of a portion of the apparatus of FIG. 3; and

FIG. 5 is a diagram of apparatus useful in practicing the present invention.

DETAILED DESCRIPTION OF THE INVENTION

Figure 1:
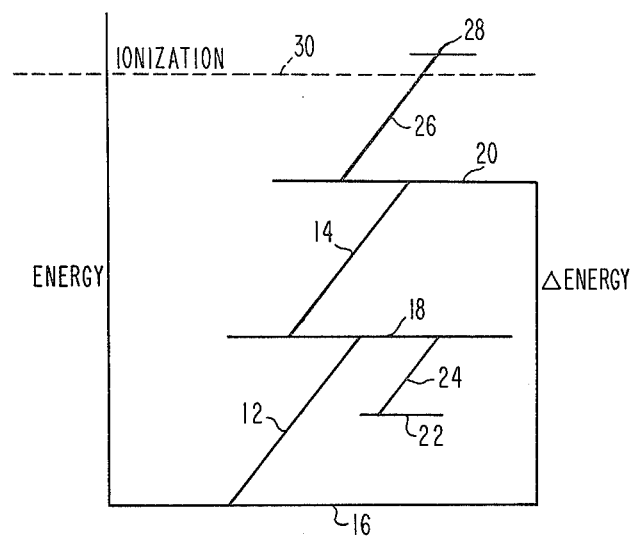
FIG. 1 is an energy level and transition diagram useful in explaining the present invention.

The present invention contemplates a system of photoexcitation and ultimately ionization with isotopic selectivity in which the ionization process and apparatus are operated in a manner to provide an enhanced separation efficiency, that is more separative work with the same or less energy input. In particular, photoexcitation is achieved in two or more energy steps through a highly excited state from which ionization is achieved, typically by laser radiation. The process thus described is illustrated in FIG. 1 showing first and second energy steps 12 and 14 from a ground state 16 to an intermediate excited state 18 and ultimately to a highly excited state 20. It may additionally be desired and is deemed preferable to also excite particles from other low-lying energy states such as the 620 cm$^{-1}$ level for the case of uranium as illustrated at level 22 and to use a further energy step 24 to excite the particles to the intermediate excited state 18. In this case, the state 18 may either be in the same exact energy level or one slightly differing in J number in order to accommodate the different J factors for the initial levels 16 and 22 as is known in the art.

Laser radiation is typically employed to produce the transitions 12 and 14 by illuminating a vapor of the particles which it is desired to photoexcite. In the application of the invention to isotope separation and in particular uranium enrichment, the vapor will constitute a vapor of uranium particles, predominantly the isotopes U-235 and U-238, and the laser radiation will be typically tuned to produce isotopic selectivity in the photoexcitation.

The process illustrated in FIG. 1 is known in the art in the general terms in which it has been described above, and indeed operates to photoexcite with isotopic selectivity uranium vapor particles of the desired isotope, U-235, to the level 20. Particles at the level 20 are ionized by the radiation of a further laser in an ionization transition 26 to an ionized level 28 above the ionization threshold 30. The clear goal of such a system is to achieve the greatest number of ionized particles of a desired isotope type with a minimum of other isotope types for the least amount of energy input, typically representing the fewest number of photons in the irradiating laser radiation. Before any degree of efficiency optimization in the overall system may be achieved, however, it is necessary to understand some of the kinematics of selective photoexcitation.

Figure 2:
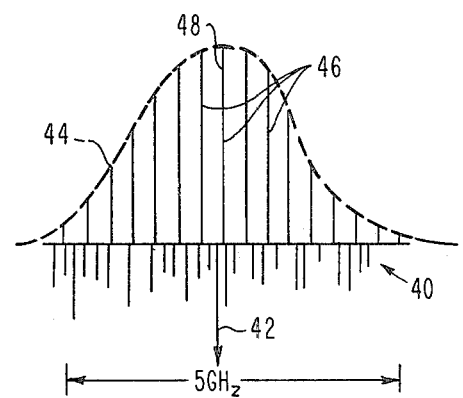
FIG. 2 is a diagram illustrating discrete atomic resonances and typical laser mode emission patterns.

Typical energy levels 18 and 20 may be selected from known tabulations such as LA-4501 *Present Status of the Analyses of the First and Second Spectra of Uranium (VI and VII) as Derived from Measurements of Optical Spectra;* Los Alamos Scientific Laboratory of the University of California, available from National Technical Information Service, U. S. Department of Commerce, 5285 Port Royal Rd., Springfield, Va. for uranium. Laser radiation is available from tuneable dye lasers of sufficiently narrow bandwidth and tuneability to produce transitions 12, 14 and 24 with isotopic selectivity. By known spectrographic analyses, the center locations of the absorption lines for the various isotopes are revealed along with the hyperfine structure, or the set of absorption lines 40 illustrated in FIG. 2 for each individual particle. The fact that the center or average absorption line, such as line 42 in FIG. 2 is not the exact frequency at which each individual particle absorbs has been long known. The line structure of lines 40 represents various effects such as hyperfine structure, plus Doppler and Zeeman splitting. This structure band may spread, for example, over a few GHz in the typical case. The absorption lines are shown of varying lengths to illustrate variations in absorption cross-sections for different lines. They are shown as an example of line structure without the intent to accurately portray the line structure of any particular transition in the uranium or other atoms.

Laser radiation generated for purposes of isotopically selective photoexcitation accordingly should have sufficient spectral purity to excite within the bandwidth of the selected isotope and not extend to the bandwidth of the undesired isotopes separated therefrom by a small frequency difference, termed the isotope shift. Depending upon the laser and its associated tuning elements, the laser will have a bandwidth such as illustrated by the envelope 44 in FIG. 2 over which the laser is capable of sufficient gain to generate output radiation. Typically, the radiation occurs at a set of frequencies termed modes 46. The frequency difference between adjacent modes corresponds to the speed of propagation within the cavity divided by the cavity length (or to ½ this value).

It is thus clear that it is literally impossible to provide a photon of a precise energy matching the precise energy change that all given particles will experience in steps 12, 14 or 24. But a given photon which is reasonably close in energy to the requisite energy change will have a significant probability of exciting an atom through that close, but not precisely matched energy change. This is an important practical consideration in view of the hyperfine structure of absorption lines and permits a situation of the type illustrated in FIG. 2 to result in practical isotopically selective photoexcitation.

It has been found that an individual atom which, at any instant of time may respond satisfactorily to radiation only close to its specific absorption line 40, is far more effectively excited if the frequency of the excitation radiation corresponds, at least for an instant, to the precise frequency of the atom's specific hyperfine absorption line. Even if the lasers are operated in a multimode fashion such that a plurality of laser mode frequencies 46 are provided within the envelope 44 roughly tailored to the bandwidth of the hyperfine structure of absorption lines, the modes over that frequency range for practical cavity lengths are not likely to be more closely spaced than, for example, at 100 megacycle intervals. As a result, exact resonance is still achieved in only isolated instances.

To overcome this difficulty in the present invention, the entire mode structure illustrated in FIG. 2 is chirped over the duration of excitation laser radiation. The radiation is applied in pulses, typically lasting at least a significant fraction of a microsecond. Each mode is then smoothly and linearly shifted in frequency an amount corresponding to at least the intermode spacing, such as 100 MHz, in a microsecond. It is clear then that each of the specific absorption lines would be covered precisely by corresponding laser radiation during each pulse cycle.

As indicated in the above-identified Belgian Pat. No. 828,557 corresponding to U.S. Patent application Ser. No. 483,077, filed June 25, 1974 now U.S. Pat. No. 4,156,144 and U.S. patent application Ser. No. 465,264, deposited Apr. 29, 1974, one of the properties which may be obtained from a carefully regulated frequency chirp in photoexcitation is adiabatic inversion of the resonating particles. When most of the particles occur in the ground energy state or the energy state at the lower end of the particular transition being induced, the chirping of a single mode line through resonance can effectively switch the energy state to the higher end of the transition termed an adiabatic inversion. The process works equally well in the other direction, operating to switch higher energy level particles to the lower end of the transition when the properly dimensioned sweep frequency passes the resonance line for that particular particle. Thus, in the case of many mode lines, and because it may be difficult to precisely control the chirp to the exact mode spacing, it is clear that although a first mode may be operative to effect adiabatic inversion, for example from energy level 16 to 18, it is clear that the passage of the second mode through the same resonance line would be effective to switch that particle from the state 18 back to the state 16 resulting in a loss of excited particles. One would accordingly appear to be switching atoms between upper and lower states without achieving any clear net gain in photoexcitation in such a case.

This difficulty is avoided, however, by further exciting or ionizing the atoms that have been switched by the chirp at a sufficient rate to insure that a substantial number of the atoms excited by the chirp are removed from the upper end energy level to higher energy levels or to ionization before the other mode line passes. For this purpose, it may be desirable that several mode lines be chirped past each specific frequency point within the bandwidth of the fine structure during each radiation pulse. An acceptable number of mode lines to be swept past would be approximately five.

Certainly, the requirement for a controlled chirp builds additional complexity into the laser systems for isotopically selective photoexcitation and ionization. Additionally, where as indicated in FIG. 1, it is desired to excite from plural low-lying energy levels such as ground level 16 and the first one or more thermally populated levels, such as level 22, the complexity multiplies if the chirping is applied to each of the lasers provided for inducing the corresponding transitions 12, 24, etc. to the first excited level 18.

At this point, the description departs from the concept of the chirp to follow another aspect of the invention. This involves the recognition, achieved in the present invention, that a system of multi-step photoexcitation, such as that shown in FIG. 1 by the steps 12 and 14, can in some respects be viewed as a single transition where the radiations are applied simultaneously or nearly so. Accordingly, the exciting photons from the laser source or sources may be viewed in the aggregate. It is then possible to deal with the energy of the aggregate, or total of the photons, corresponding to the total energy change to the upper excited state 20 from whichever initial, low-lying energy state the atoms to be excited are populating.

As thus viewed, it is possible to achieve the improvement provided by the invention from exact resonance of the aggregate energy change alone. If the total for the photons employed for the energy steps corresponds to the sum of the energy changes represented by the exact hyperfine absorption lines, then the improvement in efficiency from exact resonance is achieved. As long as the individual steps are near resonance, such as lying between mode lines as shown above, they do not have to exhibit exact resonance. What is then provided in accordance with the present invention is a system for enhancing the excitation efficiency over plural excitation steps by providing the aggregate step in exact resonance and the intermediate steps only at least close.

What this further means is that the benefits of exact resonance in the aggregate may be achieved for all particles by controlling only one of the excitation radiations for the multi-step case. While this may be done by power broadening of one radiation, it is much preferred to use a chirp on one excitation radiation source in the multi-step case.

It follows that chirping can be limited to the laser system responsible for providing the transition 14. This reduces the complexity of the laser systems by only requiring that a single laser system have the additional capability and instrumentation for producing the desired frequency chirp. In effect, the transition to the energy level 20 from whatever low-lying initial energy states are first used, is viewed as having a single resonance phenomenon including line structure spreading of the absorption band over a finite frequency. And while the radiation for individual steps 12 and 24 may not be chirped with respect to covering the specific absorption line between the elevated state 18 and the respective low-lying states 16 and 22, chirping of the radiation for the transition 14 has the effect of forcing the particles in the ground states 16 and 22 to see chirped radiation for the total transition to the state 20. Each atom is then precisely in resonance at a particular point in the frequency sweep, or several points, for the transition up to the fully excited level 20.

It is clear that a chirp at the rate of one or several mode intervals as specified above for the pulse duration, typically a microsecond, is sufficiently slow to achieve photoexcitation. How fast a chirp may be efficiently employed for this purpose depends upon the number of modes originally present in the laser.

While an advantage in convenience is achieved by having to chirp only one of the several lasers in a multi-step process, there is an advantage to chirping more than one of the lasers. If done in the same direction, chirping of both can result in increasing the line coverage by doubling the sweep rate of the upper line and reducing the average detuning from $\frac{1}{2}$ to $\frac{1}{4}$ of the mode spacing.

In addition, it is important that the chirped particles excited to the upper end of the chirped transition be excited upward rapidly to avoid their de-excitation upon the arrival of the next mode at an acceptable resonance line for the excited particle. In the case of the system of FIG. 1, this requires the ionizing radiation for the transition 26 be sufficiently intense to provide a substantial probability for ionization in the interval between mode passages of resonance lines to which the excited particles in state 20 could respond for de-excitation. In the case of uranium vapor excitation in which the U-235 isotope is to be selectively excited, the ionizing laser for the transition 26 would typically be up to approximately an order of magnitude higher in energy density than the radiation for the transitions 12, 14 and 24. There is to some extent a trade-off between the different laser intensities such that if one wishes to put more intensity in the ionizing laser for the transition 26 it is possible to employ less radiation intensity in the other lasers. The power broadening effect from chirping may also reduce the intensity requirements for the ionizing laser. Finally, the desired radiation energy densities are a function of the desired ionization probability for the complete photoexcitation and ionization scheme. Typical lower levels in the range of one-half to 25 millijoules per square centimeter provide an acceptable energy density, the ionizing radiation typically having a higher intensity. Such figures are not intended to be limiting in that substantially differing amounts of intensity or relative intensities may be employed for different particle types and different ionization probabilities.

The system of isotopically selective photoionization thus presented achieves the equivalent of a continuous spectrum of radiation through repeated chirping of mode lines through the resonances of individual atoms within the vapor.

Figure 3:
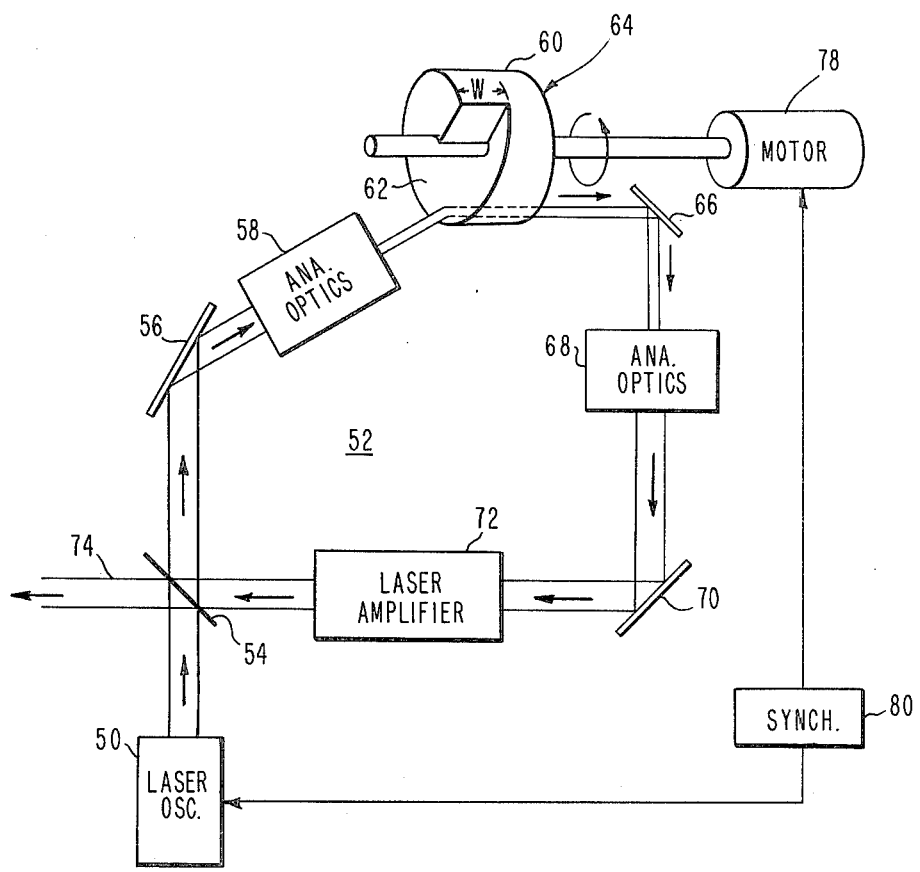
FIG. 3 is a diagram of apparatus for use in providing the frequency sweep in the present invention.

Now that the process, and parameters for practicing it, have been described for isotopically selective photoexcitation in accordance with the present invention, the structure useful for practicing it is to be described. With reference to FIG. 3, there is shown a laser system for generating chirped, multi-mode laser radiation for use in one, but conceivably more of the lasers for the various transitions 12, 14 and 24 in the excitation process. In particular, laser radiation and the desired frequency for the transition 14 is generated by a laser oscillator 10 as a series of pulses. Pulse repetition rate is preferably high, such as 10 KHz or higher, but is typically achieved at that level only by merging fully amplified pulsed radiation from several sources as is taught in U.S. Pat. No. 3,944,947. Therefore, typically pulses of the lower rate generated by a laser oscillator 50 such as a Dial-A-Line laser of the Avco Everett Research Laboratory, Inc., may be amplified and combined to achieve the desired pulse rate. At lower pulse rates, however, it is possible to achieve the benefits of the present invention.

Prior to amplification and combining, radiation pulses from the laser oscillator 50 are applied to a laser ring configuration 52 through a beam splitter 54 and reflected by a mirror 56 through anamorphic compression optics 58 to reduce the vertical dimension of the beam in the plane of the figure. This impression permits the beam to pass through a narrow outer portion of a rotating prism 60 having a helical first surface 62 and a plane second surface 64. Radiation passing through the prism 60 is reflected by a mirror 66 and passed through anamorphic expanding optics 68 to restore normal cross-section. The beam is then reflected by a further mirror 70 to be applied through a laser amplifier medium 72 for pulse amplification. The amplified pulse passes in part through the beam splitter 54 to form an output beam 74 and is in part reflected again around the closed path 52.

Preferably, the prism 60 is rotated by a motor 78 synchronized through a synchronization circuit 80 to the pulses generated by laser oscillator 50 to avoid the presence of the prism step in the helical surface 62 from occurring in the beam path during the pulse of radiation. Such synchronous operation is preferable but not necessary.

The advantage of using the anamorphic compression optics as shown in FIG. 4, permits the beam cross-section 81 to be sufficiently narrow to avoid beam divergence difficulties resulting from a variation in pitch of the helical surface 62 with radial distance from the center of rotation 82.

Typical rotation rates for the prism 60, assuming a prism radius of one centimeter to the region where the beam 80 enters the prism are on the order of magnitude of 8,000 RPM for sweep distances of a single mode. Correspondingly higher rates or prism radii could be used for higher numbers of mode shifts in each pulse.

Alternative schemes for producing frequency chirping known in the art such as the systems illustrated in the above-identified Belgian patent, incorporated herein by reference, may be employed.

The process of isotope separation is typically employed within a chamber of the type illustrated in FIG. 5. As shown there, a chamber 90 is provided which may be of the type illustrated in commonly assigned U.S. Pat. No. 3,939,354, incorporated herein by reference. The chamber contains an evacuated atmosphere consisting of a uranium vapor provided from a vapor source 92. The vapor is directed into an ion separator 94 by the vapor source 92. Laser radiation is applied through the ion separator 94 from outside the chamber 90 through a window 96 on an extension pipe 98. The radiation may further exit the chamber 90 through an extension pipe 100 and window 102 for use in subsequent, similar chambers. A set of magnetic field coils 104 surround the chamber 90 and are energized from a current source 106 to provide an axial magnetic field within the region of the separator 94 used both to direct an electron beam to the uranium metal within the vapor source 92 and to cooperate with an electric field applied within the separator 94 by a pulsed voltage source 108 to produce crossed magnetic and electric fields that extract the ionized particles from the vapor flow.

Radiation applied through the window 96 in a beam 110 has superimposed therein a plurality of colors for producing the transitions 12, 14, 24 and 26 illustrated in FIG. 1. The color combining may typically be achieved in a color combiner 112, which may be dichroic elements. The color combiner 112 in that instance receives beams of pulsed radiation from four laser systems 114, 116, 118 and 120 which may in turn include several stages of amplification as well as pulse interleaving as fully described in said U.S. Pat. No. 3,944,947, and in U.S. Pat. No. 3,924,937, also incorporated herein by reference and commonly assigned herewith.

The above-described method and apparatus is intended to be exemplary only of the invention which is to be limited only in accordance with the following claims.

What is claimed is:

1. A system for producing photoexcitation comprising:
    means for generating an environment of particles;

means for applying to said environment a first frequency of electromagnetic radiation tuned for producing excitation of particles of said environment in a first transition from a low-lying energy state to a first excited energy level below ionization;

means for applying to said environment further electromagnetic radiation to produce excitation of particles at said first excited level in a second transition to a second excited level below the ionization level; and means for producing for a substantial portion of the particles an at least instantaneous exact energy correspondence between said first and second transitions combined and said radiation of first and further frequencies combined by sweeping only the frequency of radiation producing said second transition over a selected frequency range within a selected interval of time whereby to increase the efficiency of photoexcitation from said low-lying energy state to said second excited state.

2. The system of claim 1 further including means for applying to said environment electromagnetic radiation tuned for producing a third energy transition in particles of said environment in a low-lying energy level other than the first-mentioned low-lying energy level to at least approximately said first energy level.

3. The system of claim 2 wherein said environment contains particles of plural isotope types and said means for applying electromagnetic radiation includes means for defining the frequency of the respective electromagnetic radiations such that the sum of energies at any instant in the applied electromagnetic radiation for said first and second transitions and the sum of energies for any instance in the applied electromagnetic radiation for said third and second transitions correspond to an energy which is selectively absorbed by particles of a predetermined isotope type in said environment with respect to particles of other isotope types in said environment.

4. The system of claim 1 wherein said means for applying electromagnetic radiation includes means for defining the frequencies of the respective radiations such that the total energy change for the first and second transitions to said second excited level corresponds to an energy which is preferentially absorbed by particles of one isotope type in said environment with respect to particles of other isotope types in said environment.

5. The system of claim 1 wherein said means for applying the electromagnetic radiation to produce said second transition includes a laser producing radiation output within a selected bandwidth at a plurality of mode frequencies within said bandwidth.

6. The system of claim 5 wherein adjacent ones of said mode frequencies differ in frequency approximately on the order of 100 MHz.

7. The system of claim 5 wherein said means for producing a frequency sweep produces a frequency sweep through at least one mode width of the radiation from said means for producing radiation for said second transition.

8. The system of claim 7 wherein said means for producing a frequency sweeping produces a frequency sweep corresponding to a plurality of mode widths but less than the total bandwidth for said radiation for said second transition.

9. The system of claim 5 wherein said environment includes particles of plural isotope types and said bandwidth excludes the isotope shift for the particles of said one isotope type in said environment with respect to the other isotope types for the transition from the low-lying energy level to said second excited state.

10. The system of claim 1 wherein said means for applying radiation for said first and second transitions applies radiation in substantially simultaneous pulses.

11. The system of claim 1 further including means for producing a frequency sweep in the frequency of radiation producing said first transition over a selected frequency range within a selected interval of time.

12. The system of claim 1 wherein said particles include uranium atoms.

13. The system of claim 1 further including means for depopulating said second excited state during the excitation of particles to said second excited state.

14. The system of claim 13 wherein said depopulating means includes means for ionizing particles from said second excited state.

15. The system of claim 14 wherein said ionizing means includes means for applying radiation to said environment in an intensity greater than the intensity of radiation producing said first and second transitions.

16. The system of claim 1 wherein said selected interval of time is on the order of magnitude of at least a substantial fraction of a microsecond.

17. A system for producing radiation induced excitation of particles comprising:

means for generating an environment of particles having particles of plural isotope types which absorb radiation at frequencies differing between the isotope types by a value defined as the isotope shift;

means for applying a predetermined duration of electromagnetic radiation to said environment covering a range of frequencies corresponding to at least two frequencies at which particles of a selected isotope type absorb radiation within the line structure thereof;

said applying means including means for generating said radiation at a plurality of approximately equally spaced mode lines within the bandwidth for said radiation; and means for frequency sweeping each of the plurality of mode lines corresponding to the radiation at at least one of said two frequencies so as to produce an aggregate resonance corresponding to the transition associated with the combination of said two frequencies, said frequency sweep corresponding to a plurality of the spacings between mode lines over the predetermined duration of said electromagnetic radiation.

18. The system of claim 17 wherein said means for frequency sweeping includes means for frequency sweeping said radiation a frequency corresponding to a plurality of mode spacings, but substantially less than the frequency range of the absorption line structure for said selected isotope type, while exposing particles of said selected isotope type, to a precise frequency match with one of said plurality of mode lines during each frequency sweep.

19. The system of claim 17 further including means for ionizing particles excited by said radiation.

20. The system of claim 19 wherein:

said radiation excites particles of said selected isotope type to an excited level;

said ionizing means depopulates said excited level whereby said electromagnetic radiation is able to produce continuing excitation to said excited level.

21. The system of claim 20 wherein the number of mode spacings included within the frequency sweep of each duration period of electromagnetic radiation is at least five.

22. The system of claim 19 wherein said ionizing means includes means for applying radiation of intensity greater than the intensity of said electromagnetic radiation.

23. The system of claim 17 wherein said applying means includes means for energizing said particles of a selected isotope type to a first energy level at which said frequency swept radiation is absorbed to produce a transition to a second excited state.

24. The system of claim 23 wherein said means for energizing said particles to excite them to a first excited state includes means for applying radiation of plural frequencies to excite from a plurality of low-lying energy states to first excited states therefor.

25. The system of claim 17 wherein said mode lines are separated approximately on the order of 100 MHz.

26. The system of claim 17 wherein said particles include elemental uranium.

27. A process for producing photoexcitation comprising the steps of:
generating an environment of particles;
applying to said environment a first frequency of electromagnetic radiation tuned for producing excitation of particles of said environment in a first transition from a low-lying energy state to a first excited energy level below ionization;
applying to said environment further electromagnetic radiation to produce excitation of particles at said first excited level in a second transition to a second excited level below the ionization level; and
producing for a substantial portion of the particles on at least instantaneous exact energy correspondence between said first and second transitions combined and said radiation of first and further frequencies combined by sweeping only the frequency of radiation producing said second transition over a selected frequency range within a selected interval of time thereby to increase the efficiency of photoexcitation from said low-lying energy state to said second excited state.

28. The process of claim 27 wherein said step of producing a frequency sweep produces a frequency sweep through at least one mode width of the radiation from said means for producing radiation for said second transition.

29. The process of claim 27 further including the step of depopulating said second excited state during the excitation of particles to said second excited state.

30. The process of claim 27 wherein said depopulating step includes ionizing particles from said second excited state.

31. A process for producing radiation induced excitation of particles comprising the steps of:
generating an environment of particles having particles of plural isotope types which absorb radiation at frequencies differing between the isotope types by a value defined as the isotope shift;
applying a predetermined duration of electromagnetic radiation to said environment covering a range of frequencies corresponding to at least two frequencies at which particles of a selected isotope type absorb radiation within the line structure thereof;
said applying step including the step of generating said radiation at a plurality of approximately equally spaced mode lines within the bandwidth for said radiation; and
frequency sweeping each of the plurality of mode lines corresponding to the radiation at at least one of said two frequencies so as to produce an aggregate resonance corresponding to the transition associated with the combination of said two frequencies, said frequency sweep corresponding to a plurality of the spacings between mode lines over the predetermined duration of said electromagnetic radiation.

32. The process of claim 31 wherein said step of frequency sweeping includes frequency sweeping said radiation a frequency corresponding to a plurality of mode spacings but substantially less than the frequency of the absorption line structure for said selected isotope type, while exposing particles of said selected isotope type, to a precise frequency match with one of said plurality of mode lines during each frequency sweep.

33. The process of claim 31 further including the step of ionizing particles excited by said radiation.

* * * * *